United States Patent [19]

Bender et al.

[11] 4,335,227

[45] Jun. 15, 1982

[54] RUBBER COMPOSITIONS AND METHOD OF VULCANIZING SAME IN ULTRAHIGH-FREQUENCY FIELD

[75] Inventors: Ruediger F. Bender, Marl, Fed. Rep. of Germany; Gerardus J. van Veersen, Gouda, Netherlands

[73] Assignee: Emery Industries, Inc., Cincinnati, Ohio

[21] Appl. No.: 172,349

[22] Filed: Jul. 25, 1980

[30] Foreign Application Priority Data

Aug. 2, 1979 [NL] Netherlands ............................ 7905944

[51] Int. Cl.³ .............................................. C08J 3/28
[52] U.S. Cl. ..................................... 525/333; 264/26; 525/377
[58] Field of Search .................. 525/6, 95, 333, 377; 264/25, 26

[56] References Cited

U.S. PATENT DOCUMENTS

| | | | |
|---|---|---|---|
| 3,487,132 | 12/1969 | Thorne | 264/25 |
| 3,624,189 | 11/1971 | Goldman | 264/25 |
| 3,701,702 | 10/1972 | Shichman et al. | 156/244 |
| 3,737,488 | 6/1973 | Porter et al. | 264/26 |
| 3,803,274 | 9/1974 | Nakashima et al. | 264/26 |
| 4,234,636 | 11/1980 | Thorsrud et al. | 264/26 |

FOREIGN PATENT DOCUMENTS

| | | | |
|---|---|---|---|
| 1238881 | 7/1971 | United Kingdom | 264/25 |
| 1242209 | 8/1971 | United Kingdom | 264/25 |

OTHER PUBLICATIONS

Rubber Chemistry & Technology, vol. 44, No. I, pp. 294–306, (1971, Mar.), J. Ippen.

*Primary Examiner*—Paul R. Michl
*Attorney, Agent, or Firm*—Kenneth D. Tremain

[57] ABSTRACT

The present invention provides a process for effectively curing non-polar rubbers, and more particularly light-colored compositions of ethylene-propylene-diene rubbers, in an ultrahigh-frequency field by incorporating therein a specified amount of a low molecular weight organic nitrile compound.

13 Claims, No Drawings

RUBBER COMPOSITIONS AND METHOD OF VULCANIZING SAME IN ULTRAHIGH-FREQUENCY FIELD

BACKGROUND OF THE INVENTION

Vulcanization (cross-linking) of rubber compounds in an ultrahigh frequency field, hereinafter referred to as a UHF field, has in recent years become a standard procedure in the rubber processing industry. The process has special significance for the continuous manufacture of shaped rubber articles such as extruded products. For such processes to be effective and economical it is necessary that the rubber composition be rapidly heated in the UHF field. When processing polar rubbers, e.g. nitrile rubber (NBR), the energy absorption in the high frequency alternating field is the result of the polarity of the rubber per se. However, with non-polar rubber such as ethylene-propylene-(diene) rubber [EP(D)M], natural rubber (NR), and styrene-butadiene rubber (SBR), sufficient energy absorption in the alternating electrical field is achieved only if carbon black is used as a filler. When other light-colored mineral fillers are used in the formulation of the non-polar rubber composition, the resulting formulation cannot be heated and vulcanized quickly enough due to the relatively low energy absorption of these fillers.

It is known that the energy absorption of light-colored non-polar rubber compositions can be improved by incorporating therein commonly used polar chemical compounds, for example, diethylene glycol, triethanolamine, polar plasticizers such as chlorinated hydrocarbons, as well as by the use of factices (J. Ippen, Rubber Chem. Technol., 44 (1971), No. 1, 294–306). Such additives, however, have a marked adverse affect on the vulcanization characteristics and/or the properties of the resulting vulcanizate when used in the quantities necessary to achieve sufficiently rapid heating in the UHF field.

It is further known that by mixing a polar rubber with a non-polar rubber that an appreciable increase in the energy absorption in the UHF field can be achieved. Nitrile rubber, however, is not a suitable blend component with, for instance, ethylene-propylene-diene rubbers since it adversely affects the properties of the EPDM vulcanizate.

Accordingly there is still a need for a process for quickly heating and vulcanizing non-polar rubbers, such as EPDM, in a UHF field so that the desirable properties of the rubber are maintained after vulcanization.

SUMMARY OF THE INVENTION

To meet the above need within the rubber industry we have accordingly developed the present novel process for the manufacture of rubber articles, and particularly light-colored rubber extrusions, from non-polar rubber compositions. The process of this invention makes it possible to achieve rapid heating and vulcanization in the UHF field without any impairment of the properties of the resulting vulcanized product and with the result that increased throughput is achieved.

The present invention, which relates to a process for vulcanizing rubber compositions in an ultrahigh-frequency field, comprises incorporating in the rubber composition to be cured from 0.1 to 100 parts by weight, per 100 parts by weight of the rubber, of a low molecular weight nitrile. Most generally the nitrile is present in an amount from 1 to 50 phr and, more preferably, from 5-30 phr (phr=parts per 100 parts rubber). Nitriles employed for the process of this invention typically have molecular weights less than 3000 and most usually molecular weights of the nitrile will range between 100 and 1500 and, more preferably, 125 and 1000. Useful nitrile compounds can have more than one nitrile group in the molecule. The ratio of nitrile (—C≡N) group(s) to carbon atoms in the organic moiety of the molecule can be from 1:2 to 1:30 but preferably will be from 1:3 to 1:25.

DETAILED DESCRIPTION

The present invention relates to the use of low molecular weight nitrile compounds as components for rubber compositions which are to be vulcanized (cross-linked) in an ultrahigh-frequency field. More specifically the invention relates to rubber compositions containing 0.01 to 100 parts by weight, per 100 parts by weight of the rubber, of the low molecular weight nitrile. Still more specifically the process involves the vulcanization of light-colored rubber articles from non-polar rubbers, particularly ethylene-propylene-diene rubbers.

Nitriles suitable for use in accordance with the procedure of this invention are low molecular weight organic nitriles, that is, compounds with molecular weights less than 3000. Preferably the useful nitriles for this invention have low volatility with molecular weights in the range 100 to 1500 and, more particularly, from 125 to 1000. The nitriles may contain a single nitrile or they may contain a plurality of such groups. The ratio of nitrile group(s) to the number of carbon atoms in the organic radical will range from 1:2 to 1:30 and, more preferably, from 1:3 to 1:25. Preferably the nitrile compounds are comprised only of carbon, hydrogen and nitrogen atoms and the hydrocarbon radical of the nitrile is aliphatic, cycloaliphatic, aromatic or araliphatic in nature.

Useful low molecular weight nitriles for this invention corresponding to the above definition include heptyl cyanide, octyl cyanide, pelargonic nitrile, 2-phenylpropyl nitrile, naphthonitrile, stearyl nitrile, adipic dinitrile, azelaic dinitrile and nitriles of polymer fatty acids, including dimer dinitrile and trimer trinitrile, as well as monomer nitrile, i.e. the nitrile of the monomeric acid(s) from which the polymer fatty acids are obtained. Polymer acids from which nitriles suitable for use in this process can be prepared are obtained by polymerization of unsaturated fatty acids having 12–22 carbon atoms. Nitriles of fatty acids and polymer fatty acids can be prepared in accordance with the procedure described in Beilstein, Vol. II, System Number 152-194, p. 384.

The process of this invention can be utilized with natural rubber as well as synthetic rubbers. Preferably, however, the process is utilized for the vulcanization of non-polar synthetic rubbers, such as styrene-butadiene rubber and polyolefin rubbers such as ethylene-propylene-diene rubbers. Polyolefin rubbers useful for the process of this invention consist of copolymers of ethylene and one or more alpha-olefin(s) having from 3 to 8 carbon atoms, principally propylene and/or butene-1. Optionally, one or more non-conjugated diene(s) as well as isobutylene-isoprene copolymers (IIR) may also be present. These copolymers and terpolymers are obtained by processes known to the art (German patent application DAS Nos. 15 70 352, 15 95 442 and 17 20

450, German patent application DOS No. 24 27 343 and French Pat. No. 1 508 766).

The process is particularly adaptable for use with unsaturated polyolefinic elastomers such as EPDM rubbers consisting of from 15 to 90%, and more preferably 30 to 70%, by weight ethylene; 10 to 85% and more preferably 25 to 70 wt. % propylene and/or butene-1; and one or more non-conjugated diene(s) present in an amount such that the rubber contains 0.5 to 30 double bonds per 1000 carbon atoms. Particularly useful non-conjugated dienes for the preparation of EPDM rubbers include cis- and trans-1,4-hexadiene, dicyclopentadiene, 5-methylene-2-norbornene, 5-ethylidene-2-norbornene and 5-isopropylidene-2-norbornene.

Conventional procedures are employed when combining the low molecular weight nitrile with the rubber and the usual compounding ingredients, i.e. fillers, vulcanizing agents, etc. No special processing is required—it can be accomplished using established processing procedures, that is, mixing on a mill or in an internal mixer such as a Banbury mixer.

Conventional vulcanizing agents are used in the formulation of the rubber and include primarily sulfur and/or sulfur producing compounds, such as tetramethylthiuram tetrasulfide, and the like. These can be utilized with other well known vulcanization accelerators and activators with or without the addition of zinc oxide and higher fatty acids, eg. stearic acid. Peroxides commonly used for vulcanizing rubber may also be employed, however, care must be taken during the vulcanization operation to exclude oxygen.

Commonly employed compounding ingredients which can also be present in the rubber formulation to develop the desired vulcanizate properties include fillers, plasticizers, processing aids and antioxidants. Suitable fillers include the various grades of carbon black, however, for the production of non-colored rubber compositions mineral products such as chalk, silicates, silicic acid and the like will generally be employed for this purpose. Any of the well known and commonly used plasticizers and extending agents can be included in the formulation. Refinery oils primarily comprised of aromatic, naphthenic and paraffinic fractions are commonly used for this purpose. Suitable processing aids include, for example, factices and zinc salts of higher fatty acids. Depending on the purpose of which the vulcanizate is to be used, antioxidants, antiozonants and waxes may be required and are added as necessary.

The vulcanizing agents and other compounding ingredients are used in amounts customary in the rubber processing industry. For the process of this invention the organic nitrile can be present in an amount from 0.1 to 100 phr, however, the nitrile more generally comprises from about 1 to 50 phr. In an especially preferred embodiment of this invention, 30 to 50 phr organic nitrile are employed.

Vulcanization is commenced by heating the rubber formulation containing the low molecular weight nitrile and other compounding ingredients in the ultrahigh frequency field and upon completion of vulcanization the product is removed from the field. For operation on a continuous basis for the vulcanization of extruded rubber parts, the extruded rubber composition is passed through a UHF chamber at the outlet end of the extruder and then typically through a hot air tunnel or oven. The UHF field is generally maintained at frequencies in the range $10^3$ MHz. The rate at which the extruded product is processed, which ultimately determines the efficiency of the process, is governed by the extrusion rate and rate at which the extruded product can be heated. This will vary depending on the formulation and shape (profile) of the extrusion and to effectively balance and optimize all of the process variables including the time/temperature of the rubber stock in the UHF field and hot air tunnel will require some trial runs.

A variety of useful vulcanized rubber products are obtainable by the process of this invention. Primarily, the process is adaptable for the production of rubber products capable of being formed by extrusion, such as gaskets and seals which are widely used in the building trades and for automobile manufacture.

The invention is more fully illustrated by the following Examples.

EXAMPLES 1 AND 2 AND COMPARATIVE EXAMPLE A

Following the process generally employed in the rubber processing industry, three rubber compositions as specified below were prepared on a commercial rolling mill (Troester rolling mill, diameter 200 mm, length 450 mm) at a friction of 24:28 and with a cooling water temperature of 50° C. The nitrile was mixed in with the other compounding ingredients.

|  | EXAMPLES | | |
| --- | --- | --- | --- |
|  | 1 | 2 | A |
| EPDM (BUNA ® AP 451)* | 100.0 | 100.0 | 100.0 |
| Zinc oxide | 5.0 | 5.0 | 5.0 |
| Stearic acid | 2.0 | 2.0 | 2.0 |
| Commercial silicic acid | 35.0 | 35.0 | 35.0 |
| Commercial silica | 100.0 | 100.0 | 100.0 |
| Commercial paraffin mineral oil | 25.0 | — | 40.0 |
| Diethylene glycol | 2.0 | 2.0 | 2.0 |
| Polyethylene glycol (Mol. wt. 6000) | 3.0 | 3.0 | 3.0 |
| Commercial silane (POLYVEST ® 25) | 2.0 | 2.0 | 2.0 |
| Titanium dioxide | 10.0 | 10.0 | 10.0 |
| Heptyl cyanide | 25.0 | 50.0 | — |
| Zinc dibutyldithiocarbamate | 1.5 | 1.5 | 1.5 |
| Tetramethylthiuramtetrasulphide | 2.0 | 2.0 | 2.0 |
| Zinc-N-diethyldithiocarbamate | 0.8 | 0.8 | 0.8 |
| Tetramethylthiuramdisulphide | 0.8 | 0.8 | 0.8 |
| Sulphur | 0.4 | 0.4 | 0.4 |
| Commercial calcium oxide | 10.0 | 10.0 | 10.0 |

*BUNA ® AP 451 is an ethylene/propylene/5-ethylidene-2-norbornene-terpolymer having a Mooney viscosity ML 1 + 4 at 100° C. of 95 and a statistical distribution of the monomers.

The compositions were extruded in a 6 D extruder having a screw speed of 15 r.p.m. to a cylindrical profile of 45–50 mm diameter and cut into pieces of 50 mm length. To measure their energy absorption in the UHF field, the resulting cylindrical samples were placed in a Menschner UHF preheating apparatus, model MV 300 (supply voltage 220 V, nominal absorption 1.28 KW, UHF frequency 2450 MHz, UHF power adjustable from 0 to 650 W). At regular intervals during the heating thereof in the UHF field (at 650 W capacity) the temperature was measured, using an inserted thermometer. The experiment was carried out three times for each composition and the arithmetic average of these temperature measurements, performed at predetermined time intervals was reported. For the above compositions the temperatures were measured after 30, 60 and 120 seconds.

|  | EXAMPLES | | |
|---|---|---|---|
|  | 1 | 2 | A |
| Temperature (°C.) in the UHF field after 30 sec. | 64 | 83 | 36 |
| Temperature (°C.) in the UFH field after 60 sec. | 94 | 117 | 42 |
| Temperature (°C.) in the UHF field after 120 sec. | 174 | 144 | 57 |

The values as measured show that composition A, containing no nitrile, even after a 120-second residence time in the UHF field, had not reached temperature levels achieved after only 30 seconds with the compositions containing 25 and 50 parts p.h.r. heptylcyanide. Also, it is evident from these experiments that the rate of heating increases in proportion to the nitrile content of the mixtures.

The physical properties of the rubber compositions was determined. The data given below, determined in accordance with the appropriate DIN specifications shows that the affect of the nitrile on the properties of the vulcanizate is not significant.

|  |  | EXAMPLES | | |
|---|---|---|---|---|
|  |  | 1 | 2 | A |
| Vulcameter 180° C.  $t_{10}$ (min) (DIN 53 529) |  | 1.3 | 1.3 | 1.3 |
| $t_{90}$ (min) |  | 2.6 | 2.6 | 3.0 |
| Vulcanization 10′ at 180° C. |  |  |  |  |
| Tensile strength (DIN 53 504) | MPa | 8.4 | 7.0 | 8.3 |
| Elongation at break (DIN 53 504) | % | 631 | 417 | 612 |
| Modulus 300% elongation (DIN 53 504) | MPa | 4.1 | 5.9 | 4.3 |
| Hardness (DIN 53 505) | Shore A | 65 | 74 | 63 |
| Impact elasticity (DIN 53 512) | % | 45 | 47 | 41 |
| Compression set B 24 h - 70° C. (DIN 53 517) | % | 30 | 32 | 31 |
| Compression set B 24 h - 100° C. (DIN 53 517) | % | 51 | 54 | 56 |

EXAMPLES 3 AND 4

The EPDM compositions stated below are distinguished from the EPDM compositions 1 and 2 of Example 1 only by the type and amount of nitrile used. The nitrile used in this case was octyl cyanide. The composition was prepared and tested as described in the preceding Examples.

|  | EXAMPLES | |
|---|---|---|
|  | 3 | 4 |
| EPDM (BUNA ® AP 451) | 100.0 | 100.0 |
| Zinc oxide | 5.0 | 5.0 |
| Commercial silicic acid | 35.0 | 35.0 |
| Stearic acid | 2.0 | 2.0 |
| Commercial silica | 100.0 | 100.0 |
| Commercial paraffin mineral oil | 40.0 | 25.0 |
| Diethylene glycol | 2.0 | 2.0 |
| Polyethylene glycol (mol. wt. 6000) | 3.0 | 3.0 |
| Commercial silane (POLYVEST ® 25) | 2.0 | 2.0 |
| Titanium dioxide | 10.0 | 10.0 |
| Octyl cyanide | 10.0 | 25.0 |
| Zincdibutyldithiocarbamate | 1.5 | 1.5 |
| Tetramethylthiuramtetrasulphide | 2.0 | 2.0 |
| Zinc-N-diethyldithiocarbamate | 0.8 | 0.8 |
| Tetramethylthiuramdisulphide | 0.8 | 0.8 |
| Sulphur | 0.4 | 0.4 |
| Commercial calcium oxide | 10.0 | 10.0 |
| Temperature (°C.) in the UHF field after: |  |  |
| 30 sec. | 49 | 59 |
| 60 sec. | 74 | 88 |
| 120 sec. | 116 | 137 |
| Vulcameter 180° C.  $t_{10}$ (min.) | 1.3 | 1.3 |
| $t_{90}$ (min.) | 2.8 | 2.6 |
| Vulcanization: 10 min. at 180° C. |  |  |
| Tensile strength   MPa | 7.3 | 7.4 |
| Elongation at break   % | 669 | 672 |
| Modulus 300% elongation   MPa | 3.4 | 3.4 |
| Hardness   Shore A | 61 | 61 |
| Impact elasticity   % | 44 | 45 |
| Compression set B 24 h - 70° C.   % | 26 | 27 |
| Compression set B 24 h - 100° C.   % | 51 | 53 |

These examples show that when octylcyanide is used, heating of the EPDM composition in the UHF field was achieved as quickly as when heptyl cyanide was used and that the octylcyanide had no appreciable affect on the properties of the resulting EPDM vulcanizate.

EXAMPLES 5-12

Other nitriles were formulated with EPDM and tested in accordance with the procedure of Example 1.

|  |  |  | Temperature of the composition in the UHF field after | | |
|---|---|---|---|---|---|
| Ex. | Nitrile |  | 30 sec. | 60 sec. | 120 sec. |
| 5 | Pelargonic nitrile | 10 phr | 28 | 36 | 54 |
|  |  | 25 phr | 34 | 53 | 90 |
|  |  | 50 phr | 55 | 94 | 157 |
| 6 | Adipic dinitrile | 10 phr | 38 | 55 | 81 |
|  |  | 25 phr | 54 | 87 | 126 |
| 7 | Azelaic dinitrile | 10 phr | 35 | 50 | 76 |
|  |  | 25 phr | 39 | 66 | 113 |
| 8 | Monomer nitrile | 10 phr | 37 | 51 | 75 |
|  |  | 25 phr | 42 | 61 | 90 |
|  |  | 50 phr | 55 | 93 | 137 |
| 9 | Dimer dinitrile | 10 phr | 40 | 53 | 83 |
|  |  | 25 phr | 52 | 76 | 119 |
|  |  | 50 phr | 57 | 92 | 147 |
| 10 | Stearyl nitrile | 10 phr | 41 | 57 | 85 |
|  |  | 25 phr | 52 | 74 | 113 |
|  |  | 50 phr | 61 | 97 | 153 |
| 11 | 2-Phenylpropyl nitrile | 5 phr | 43 | 63 | 100 |
|  |  | 10 phr | 46 | 71 | 112 |
| 12 | α-Naphthonitrile | 5 phr | 46 | 66 | 109 |
|  |  | 10 phr | 51 | 81 | 131 |

EXAMPLES 13-16 AND COMPARATIVE EXAMPLE B

The following EPDM compositions are distinguished from those previously described by the type and amount of the mineral fillers used as additives. The compositions were prepared and tested as described in Example 1.

|  | EXAMPLES | | | | |
|---|---|---|---|---|---|
|  | 13 | 14 | 15 | 16 | B |
| EPDM (BUNA ® AP 451) | 100.0 | 100.0 | 100.0 | 100.0 | 100.0 |
| Zinc oxide | 5.0 | 5.0 | 5.0 | 5.0 | 5.0 |
| Stearic acid | 1.0 | 1.0 | 1.0 | 1.0 | 1.0 |
| Commercial highly active silicate | 70.0 | 70.0 | 70.0 | 70.0 | 70.0 |
| Commercial silicate (80% $SiO_2$) | 70.0 | 70.0 | 70.0 | 70.0 | 70.0 |
| Commercial paraffin mineral oil | 30.0 | 30.0 | 30.0 | 30.0 | 30.0 |
| Diethylene glycol | 2.0 | 2.0 | 2.0 | 2.0 | 2.0 |
| Polyethylene glycol (mol. wt. 6000) | 3.0 | 3.0 | 3.0 | 3.0 | 3.0 |

-continued

| | EXAMPLES | | | | |
|---|---|---|---|---|---|
| | 13 | 14 | 15 | 16 | B |
| Titanium dioxide | 10.0 | 10.0 | 10.0 | 10.0 | 10.0 |
| Commercial silane (POLYVEST® 25) | 3.0 | 3.0 | 3.0 | 3.0 | 3.0 |
| 2-Phenylpropylnitrile | 5.0 | 10.0 | — | — | — |
| α-Naphthonitrile | — | — | 5.0 | 10.0 | — |
| Zinc dibutyldithiocarbamate | 2.0 | 2.0 | 2.0 | 2.0 | 2.0 |
| Commercial vulcanization retarder | 0.8 | 0.8 | 0.8 | 0.8 | 0.8 |
| Tetramethylthiuram disulphide | 0.7 | 0.7 | 0.7 | 0.7 | 0.7 |
| Morpholine disulphide | 1.5 | 1.5 | 1.5 | 1.5 | 1.5 |
| Dibenzothiazyl disulphide | 1.0 | 1.0 | 1.0 | 1.0 | 1.0 |
| Sulphur | 0.5 | 0.5 | 0.5 | 0.5 | 0.5 |
| Commercial calcium oxide | 10.0 | 10.0 | 10.0 | 10.0 | 10.0 |
| Temperature (°C.) in the UHF field after: | | | | | |
| 30 sec. | 44 | 59 | 46 | 54 | 41 |
| 60 sec. | 70 | 91 | 76 | 88 | 58 |
| 120 sec. | 124 | 158 | 142 | 154 | 94 |

The following rubber technological data were determined as described in Example 1.

| | | EXAMPLES | | | | |
|---|---|---|---|---|---|---|
| | | 13 | 14 | 15 | 16 | B |
| Vulcameter 180° C. | $t_{10}$ (min.) | 1.6 | 1.7 | 1.6 | 1.6 | 1.6 |
| | $t_{90}$ (min.) | 3.3 | 3.2 | 3.4 | 3.1 | 3.2 |
| Vulcanization: 10′ at 180° C. | | | | | | |
| Tensile strength | MPa | 8.4 | 7.8 | 8.0 | 7.4 | 8.6 |
| Elongation at break | % | 418 | 385 | 390 | 364 | 402 |
| Modulus 300% elongation | MPa | 6.5 | 6.4 | 6.5 | 6.2 | 6.8 |
| Hardness | Shore A | 78 | 76 | 78 | 76 | 80 |
| Impact elasticity | % | 35 | 35 | 34 | 35 | 34 |
| Compr. set B 24 h - 70° C. | % | 40 | 41 | 42 | 40 | 41 |
| Compr. set B 24 h - 100° C. | % | 66 | 68 | 67 | 68 | 65 |

EXAMPLE 17 AND COMPARATIVE EXAMPLE C

The following EPDM compositions which contain carbon black as filler were prepared and tested as described in Example 1. The power applied for heating in the UHF field was 320 W. Physical properties of the resulting vulcanizates were also determined and are provided.

| | | EXAMPLES | |
|---|---|---|---|
| | | 17 | C |
| EPDM (BUNA® AP 451) | | 100.0 | 100.0 |
| Zinc oxide | | 5.0 | 5.0 |
| Stearic acid | | 1.0 | 1.0 |
| FEF carbon black, N 550 | | 80.0 | 80.0 |
| SRF carbon black, N 774 | | 30.0 | 30.0 |
| Commercial paraffin mineral oil | | 65.0 | 65.0 |
| Polyethylene glycol (mol. wt. 4000) | | 3.0 | 3.0 |
| Diethylene glycol | | 2.0 | 2.0 |
| Azelaic dinitrile | | 5.0 | — |
| Telluriumdiethyldithiocarbamate | | 0.5 | 0.5 |
| Tetramethylthiuram disulphide | | 0.8 | 0.8 |
| Sulphur | | 0.8 | 0.8 |
| Tetramethylthiruam monosulphide | | 0.8 | 0.8 |
| Zinc dibutyldithiocarbamate | | 1.2 | 1.2 |
| Dibenzothiazyl disulphide | | 1.0 | 1.0 |
| Commercial calcium oxide | | 5.0 | 5.0 |
| Temperature (°C.) in the UHF field after: | | | |
| 15 sec. | | 71 | 63 |
| 30 sec. | | 109 | 102 |
| 45 sec. | | 141 | 132 |
| 60 sec. | | 177 | 161 |
| Vulcameter 180° C. | $t_{10}$ (min.) | 1.6 | 1.5 |
| | $t_{90}$ (min.) | 3.5 | 3.5 |
| Vulcanization: 10′ at 180° C. | | | |
| Tensile strength | MPa | 9.8 | 9.5 |
| Elongation at break | % | 622 | 518 |
| Modulus 300% Elongation | MPa | 4.9 | 6.1 |
| Hardness | Shore A | 58 | 60 |
| Impact elasticity | % | 39 | 38 |
| Compression set B 24 h - 70° C. | % | 26 | 21 |

EXAMPLES 18-20 AND COMPARATIVE EXAMPLES D-F

In the following Examples azelaic dinitrile was used in mixtures of different rubber compositions. Preparation and tests were carried out as described in Example 1.

| | | EXAMPLES | | | | | |
|---|---|---|---|---|---|---|---|
| | | 18 | 19 | 20 | D | E | F |
| SBR (BUNA Huls 1551) | | 100.0 | — | — | 100.0 | — | — |
| NR (Smoked Sheets) | | — | 100.0 | — | — | 100.0 | — |
| Butyl rubber (Esso Butyl 356) | | — | — | 100.0 | — | — | 100.0 |
| Zinc oxide | | 5.0 | 5.0 | 5.0 | 5.0 | 5.0 | 5.0 |
| Stearic acid | | 1.0 | 2.0 | 1.0 | 1.0 | 2.0 | 1.0 |
| Commercial anhydrous Al-silicate | | 130.0 | 130.0 | 130.0 | 130.0 | 130.0 | 130.0 |
| Diethylene glycol | | 2.0 | 2.0 | 2.0 | 2.0 | 2.0 | 2.0 |
| Commercial naphthenic mineral oil | | 20.0 | 20.0 | 20.0 | 30.0 | 30.0 | 30.0 |
| Azelaic dinitrile | | 10.0 | 10.0 | 10.0 | — | — | — |
| 2-Mercaptobenzimidazole | | 1.0 | 1.0 | 1.0 | 1.0 | 1.0 | 1.0 |
| Benzothiazyl-2-cyclohexyl-sulpheneamide | | 2.0 | 2.0 | — | 2.0 | 2.0 | — |
| Tetramethylthiuram disulphide | | 0.4 | 0.2 | 0.5 | 0.4 | 0.2 | 0.5 |
| Sulphur | | 1.5 | 1.5 | 1.5 | 1.5 | 1.5 | 1.5 |
| Dibenzothiazyl disulphide | | — | — | 1.0 | — | — | 1.0 |
| Zinc dibutyldithiocarbamate | | — | — | 2.0 | — | — | 2.0 |
| Temperature (°C.) in the UHF field after: | | | | | | | |
| 30 sec. | | 31 | 33 | 30 | 23 | 25 | 23 |
| 60 sec. | | 47 | 45 | 43 | 25 | 28 | 26 |
| 120 sec. | | 79 | 70 | 65 | 31 | 33 | 32 |
| Vulcameter 170° C. | $t_{10}$ (min.) | 2.1 | 1.5 | 3.1 | 4.1 | 2.2 | 3.5 |
| | $t_{90}$ (min.) | 2.8 | 2.2 | 11.1 | 5.2 | 2.9 | 11.9 |
| Vulcanization: 10′ at 170° C. | | | | | | | |
| Tensile strength | MPa | 6.9 | 9.8 | 4.1 | 7.5 | 10.2 | 5.0 |
| Elongation at break | % | 754 | 566 | 776 | 783 | 524 | 759 |

-continued

| | | EXAMPLES | | | | | |
|---|---|---|---|---|---|---|---|
| | | 18 | 19 | 20 | D | E | F |
| Modulus 300% elongation | MPa | 2.0 | 3.3 | 0.9 | 2.2 | 4.2 | 1.3 |
| Hardness | Shore A | 53 | 49 | 42 | 55 | 52 | 43 |
| Impact elasticity | % | 42 | 50 | 10 | 42 | 50 | 10 |
| Compression set B 22 h- 70° C. | % | 14 | 25 | 41 | 15 | 22 | 40 |

We claim:

1. A rubber composition capable of being vulcanized in an ultrahigh-frequency field comprising a non-polar synthetic rubber selected from the group consisting of styrene-butadiene rubber and polyolefin rubber, conventional vulcanizing agents and additives and 0.1 to 100 phr of an organic nitrile selected from heptyl cyanide, octyl cyanide, pelargonic nitrile, 2-phenylpropyl nitrile, naphthonitrile, stearyl nitrile, adipic dinitrile, azelaic dinitrile, and nitriles of monomer and polymer fatty acids.

2. The rubber composition of claim 1 wherein the non-polar rubber is styrene-butadiene rubber or a polymer of ethylene with one or more alpha-olefins having 3 to 8 carbon atoms, and optionally, one or more non-conjugated dienes.

3. The rubber composition of claim 2 wherein the non-polar rubber is an ethylene-propylene-diene rubber containing from 15% to 90% by weight ethylene, 10% to 85% by weight propylene, and one or more non-conjugated dienes present in an amount such that the rubber contains 0.5 to 30 double bonds per 1000 carbon atoms and the organic nitrile is present in an amount from 1 to 50 phr.

4. The rubber composition of claim 3 wherein the non-conjugated diene is selected from the group consisting of cis-1,4-hexadiene, trans-1,4-hexadiene, dicyclopentadiene, 5-methylene-2-norbornene, 5-ethylidene-2-norbornene, and 5-isopropylidene-2-norbornene.

5. The rubber composition of claim 3 or 4 wherein the organic nitrile is present in an amount from 30 to 50 phr.

6. The rubber composition of claim 3 or 4 wherein the non-polar rubber is essentially free of carbon black fillers.

7. The rubber composition of claim 3 or 4 which is vulcanized.

8. A process for vulcanizing a non-polar synthetic rubber selected from the group consisting of styrene-butadiene rubber and polyolefin rubber which comprises incorporating from 0.1 to 100 phr of an organic nitrile selected from heptyl cyanide, octyl cyanide, pelargonic nitrile, 2-phenylpropyl nitrile, naphthonitrile, stearyl nitrile, adipic dinitrile, azelaic dinitrile and nitriles of monomer and polymer fatty acids, in the rubber containing conventional vulcanizing agents and additives and thereafter exposing to an ultrahigh-frequency field for a period of time sufficient to effect vulcanization.

9. The process of claim 8 wherein the non-polar rubber is a polymer of ethylene with one or more alpha-olefins having from 3 to 8 carbon atoms and, optionally, one or more non-conjugated dienes and the organic nitrile is present in an amount from 1 to 50 phr.

10. The process of claim 9 wherein the alpha-olefin is propylene or butene-1.

11. The process of claim 10 wherein the non-polar rubber is an ethylene-propylene-diene rubber containing from 15% to 90% by weight ethylene, 10% to 85% by weight propylene, and one or more non-conjugated dienes present in an amount such that the rubber contains 0.5 to 30 double bonds per 1000 carbon atoms.

12. The process of claim 11 wherein the non-conjugated diene is selected from the group consisting of cis-1,4-hexadiene, trans-1,4-hexadiene, dicyclopentadiene, 5-methylene-2-norbornene, 5-ethylidene-2-norbornene, and 5-isopropylidene-2-norbornene.

13. The process of claim 9 wherein the non-polar rubber is essentially free of carbon black fillers.

* * * * *